United States Patent [19]

Haynes

[11] 4,143,708

[45] Mar. 13, 1979

[54] SALVAGING AND RESTRAINING RECUPERATOR FROM COLLAPSE

[75] Inventor: Eugene M. Haynes, Hebron, Ohio

[73] Assignee: Owens-Corning Fiberglas Corporation, Toledo, Ohio

[21] Appl. No.: 841,498

[22] Filed: Oct. 11, 1977

[51] Int. Cl.² ............................................. F28F 1/32
[52] U.S. Cl. .................................... 165/76; 165/169; 264/36; 220/445; 165/81; 432/3
[58] Field of Search ............... 165/76, 1, 10; 220/45; 138/97; 264/30, 36; 432/3, 76

[56] References Cited

U.S. PATENT DOCUMENTS

| 2,391,876 | 1/1946 | Brown | 165/76 |
| 3,201,108 | 8/1965 | Kramer | 165/81 |
| 3,547,202 | 12/1970 | Ticknor | 165/83 |
| 3,847,208 | 11/1974 | Ollendorf | 220/445 |

FOREIGN PATENT DOCUMENTS 1008856  5/1957  Fed. Rep. of Germany ............. 165/76

*Primary Examiner*—Charles J. Myhre
*Assistant Examiner*—Theophil W. Streule, Jr.

*Attorney, Agent, or Firm*—Ronald C. Hudgens; Robert F. Rywalski; Charles F. Schroeder

[57] ABSTRACT

Heat exchange apparatus of the recuperator type is provided with means by which the inner tubular member can be withdrawn from a state of collapse and restrained in a position against further collapse. The heat exchange apparatus comprises a first tubular member having hookable means thereon; a second tubular member generally coaxial with said first member and disposed outwardly thereof so as to define a fluid flow zone therebetween, said second member having at least one passage therethrough in communication with said fluid flow zone and an outwardly disposed passage-circumscribing ring; a rod member extending inwardly through said passage and into said flow zone, means carried by the inward end of said rod in hooked relationship with said hookable means; an apertured cap disposed coaxially about said rod outwardly of said second tubular member and means substantially simultaneously compressingly urging said cap against said ring member to provide a seal therebetween while outwardly tensioning said rod member.

6 Claims, 2 Drawing Figures

SALVAGING AND RESTRAINING RECUPERATOR FROM COLLAPSE

The present invention relates to heat exchangers in general and is particularly applicable to recuperators in which hot gases, such as the products of combustion, or flue gases, are used to preheat makeup, or combustion, air to be used in a combustion process.

In manufacturing glass, flue gases are conveyed from the melting area into the internal duct of a recuperator and combustion air is conveyed internally of the external duct of the recuperator in heat exchanging relation to the external surface of the internal duct. Such manufacture and the configuration of the recuperator is set forth in U.S. Pat. No. 3,547,202 which is hereby incorporated by reference. In accordance with the teachings of that patent, means are provided for maintaining the spacing between the duct members of a recuperator within a predetermined range to control the size of the passageway and provide support from one of the members to the other. The spacing means includes a first element extending from one of the members and having hook means formed thereon and a second element extending from the second member towards the first member and having an opening formed therein to receive and restrain movement of the hook means in response to varying temperature conditions. Preferably in accordance with the teachings of that patent rows of such elements are provided.

While the teachings of that patent have been employed quite successfully, to accomplish the purposes set forth therein, nonetheless it occasionally happens that during operation, a severe collapse of the inner tube of the recuperator is experienced. When this results there is an unacceptable deterioration of the heat transfer and melting operation primarily resulting from a severe increase in the pressure drop of the flue gases flowing through the internal tubular member of the recuperator. Such collapse not only provides economic penalties to the process but may also create a health hazard. One way of resolving that problem is, of course, to discontinue use of the recuperator, perhaps shutting-down the entire melting operation, and replacing the recuperator. This obviously is an unacceptable, expensive and time consuming procedure. It will thus be appreciated by those skilled in the art that there is a need to solve this problem in an expedient, simple and economical manner. Applicant has now satisified this need and solves this problem by providing for means which can be employed to relieve the inner duct of a recuperator from its state of collapse and restrain it from further collapse.

Thus, in accordance with one feature of this invention there is provided recuperative heat exchange apparatus comprising first and second laterally spaced ducts, hookable means carried by said first duct, and elongate member passing through said second duct in hooked relationship with said hookable means, and means in contact with said elongate member for restraining movement thereof.

In accordance with another feature of this invention, the latter means comprises an apertured member in circumscribing contact with said elongate member. Yet according to another feature of this invention the apparatus further includes sealing means disposed outwardly of said second duct for minimizing and substantially eliminating fluid flow between the spacing of said first and second ducts and the ambient surroundings. Yet in accordance with another feature of this invention there is provided apparatus wherein said sealing means comprises a seal-providing member circumferentially disposed about said member and wherein said apertured member exerts a seal maintaining force on said seal-providing member.

The foregoing will be more apparent by reference to the drawings wherein.

Figure 1:
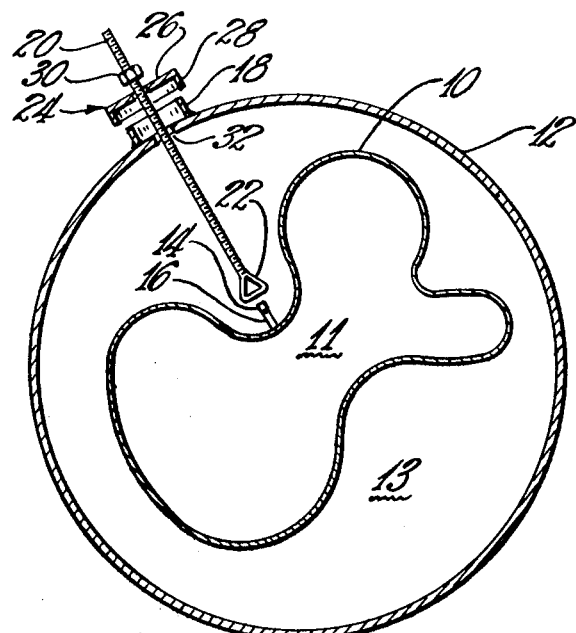
FIG. 1 is a horizontal cross-sectional view of the recuperator exemplifing the collapsed nature of the inner tube and exemplifing apparatus for relieving such collapsed condition.

Before describing the present invention in more detail, and generally with regard to FIG. 1, it will be appreciated that, while the invention is shown and described with regard to a single hookable means on the inner duct of the recuperator, a plurality of such means and the apparatus as contemplated herein will generally be employed. Depending upon the severity of the collapse it may be necessary to employ an array along the longitudinal axis of the recuperator and/or an array disposed radially thereof of the novel means of the present invention for solving the problem. The hookable means which are provided on the inner shell of the recuperator can be exactly that described in U.S. Pat. No. 3,547,202. That is, it may be in the form of a U-shaped bracket, or an eye, or it may be a suitable member having a hookable flange portion.

Referring now to FIG. 1 there is generally shown a metal recuperator, of the type employed in glass melting, in a state of collapse. The recuperator comprises an external tubular member, or duct, 12 and an internal tubular member, or duct, 10. It will of course be apparent that if tubular member 10 were not in the state of collapse, as shown, it would generally be in the form of an inscribed circle concentric with external duct 12. These tubular members define two isolated zones one of which is zone 11, in which flue gases flow, and the other of which is zone 13 through which make-up, or combustion air flows in heat exchanging contact with the external surface of tubular member 10. Tubular member 10 carries an outwardly extending hookable means in the form of a rod 16 having a depending flange 14.

In order to relieve the state of collapse, external duct 12 is provided, such as for example by drilling, with a passage 32 through which a generally elongate member, or rod, 20 is inserted as exemplified in FIG. 1. Rod 20 includes, as its inward end, suitable means, e.g. a eye 22, for hooking onto the hookable means of tubular member 10, for example, flange 14. Additionally, external tubular member 12 is provided, such as for example by welding, with an outwardly disposed ring member 18. Ring member 18 preferably is symmetrically coaxial with passage 32. Elongate rod 20 will be at least partially threaded and will carry with it a nut 30 and, disposed inwardly of nut 30, a cap 24. Preferably cap 24 will include a centrally apertured panel 26 and a depending circumferential flange 28.

Figure 2:
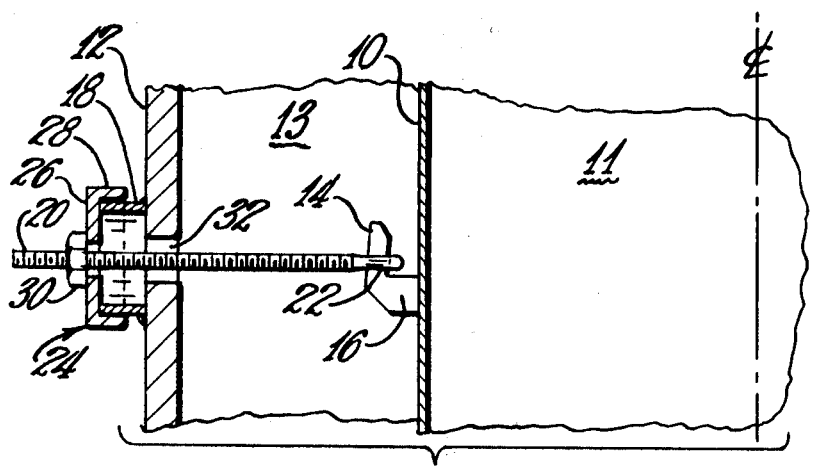
FIG. 2 is, generally, a partial, exaggerated cross-sectional elevation view showing the recuperator in its relieved condition by use of this invention.

As previously indicated, elongate rod 20 will be inserted within passage 32 so as to bring its integral hooking means, preferably in the form of an eye 22, into hooked relationship with flange 14. Nut 30 may then be tightened upon the threads of rod 20 ultimately bringing about contact with panel 26 of cap 24. With continued tightening of nut 30, cap 24 is brought into sealing contact with ring member 18 and elongate rod 20 is drawn outwardly and, because of the hook relationship of the hooking means, e.g. eye 22 with flange 14, the collapsed portion of internal tubular duct 10 is likewise drawn outwardly. Such tightening and movement is continued for a suitable period of time so as to, as nearly as practicable, bring the internal tubular member into its original configuration and hence reducing the severe pressure drop of flue gases flowing in zone 11. FIG. 2 somewhat exaggeratingly illustrates the final relationship of the apparatus of this invention wherein internal tubular member 10 is restrained from further collapse.

Apparatus of the type described above was successfully employed more than one year ago in a foreign country to successfully solve a severe collapse and allowing the continued operation of a glass manufacturing facility.

While the foregoing specifically describes the present invention it will, of course, be apparent that modifications are possible which, pursuant to the patent statutes and laws, do not depart from the spirit and scope thereof.

I claim:

1. Heat exchange apparatus comprising:
   a first tubular member having hookable means thereon;
   a second tubular member generally coaxial with said first member and disposed outwardly thereof so as to define a fluid flow zone therebetween, said second member having at least one passage therethrough in communication with said fluid flow zone and including an outwardly disposed passage-circumscribing ring;
   a rod member extending inwardly through said passage into said flow zone, hook means carried by the inward end of said rod in hooked relationship with said hookable means;
   an apertured cap disposed coaxially about said rod outwardly of said second tubular member and means substantially simultaneously compressingly holding said cap against said ring member to provide a seal therebetween while outwardly tensioning said rod member to thereby hold said first tubular member in a position restrained against collapse.

2. Apparatus of claim 1 wherein said latter means comprises a nut.

3. Recuperative heat exchange apparatus comprising:
   first and second laterally spaced ducts, hookable means directly carried by said first duct, an elongate member passing through said second duct in hooked relationship with said hookable means, and means in contact with said elongate member for restraining inward movement thereof.

4. The apparatus of claim 3 wherein said latter means comprises an apertured member in circumscribing contact with said elongate member.

5. The apparatus of claim 4 and further including sealing means disposed outwardly of said second duct for minimizing fluid flow between the spacing of said first and second ducts and the ambient surroundings.

6. The apparatus of claim 5 wherein said sealing means comprises a seal-providing cap member circumferentially disposed about said elongate member and wherein said apertured member holdingly exerts a seal maintaining force on said seal-providing cap member.

* * * * *